(12) United States Patent
Yeh (10) Patent No.: US 7,447,846 B2
(45) Date of Patent: Nov. 4, 2008

(54) NON-VOLATILE MEMORY SHARING APPARATUS FOR MULTIPLE PROCESSORS AND METHOD THEREOF

(75) Inventor: Hsin-Chung Yeh, Hsinchu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 386 days.

(21) Appl. No.: 11/279,562

(22) Filed: Apr. 12, 2006

(65) Prior Publication Data

US 2007/0245092 A1    Oct. 18, 2007

(51) Int. Cl.
*G06F 12/00* (2006.01)
(52) U.S. Cl. .............................. 711/147; 711/148; 713/2
(58) Field of Classification Search ........................ None
See application file for complete search history.

(56) References Cited

U.S. PATENT DOCUMENTS

| | | | |
|---|---|---|---|
| 4,590,556 A | * | 5/1986 | Berger et al. ................... 713/1 |
| 6,526,322 B1 | | 2/2003 | Peng et al. |
| 6,930,634 B2 | | 8/2005 | Peng et al. |

\* cited by examiner

*Primary Examiner*—Reginald G. Bragdon
*Assistant Examiner*—Ngoc V Dihn
(74) *Attorney, Agent, or Firm*—Winston Hsu (57) ABSTRACT

A multiple processor system includes a plurality of processors including a first processor and a second processor; a program code storage module coupled to the first processor, the program code storage module for storing program code including first program code for the first processor and second program code for the second processor; and a processor bridge coupled between the first processor and the second processor; wherein the first processor executes the first program code, the second processor is for sending an access request requesting data corresponding to the second program code to the processor bridge; the first processor is for retrieving the access request from the processor bridge, fetching the data from the second program code in the program code storage module according to the access request, and delivering the data to the processor bridge; and the second processor is further for fetching the data from the processor bridge.

20 Claims, 6 Drawing Sheets

NON-VOLATILE MEMORY SHARING APPARATUS FOR MULTIPLE PROCESSORS AND METHOD THEREOF

BACKGROUND OF THE INVENTION

1. Field of the Invention

This invention relates to non-volatile memory sharing, in particular, a flash memory, EEPROM device, or battery backup memory sharing apparatus for multiple processors and a related method thereof.

2. Description of the Prior Art

In order to maintain cost effectiveness for new and rapidly growing technologies, electronics manufacturers continually search for methods and architectures to reduce design constraints, component usage and overall resource requirements. This line of forward thinking helps ensure that electronic devices remain affordable and effective as various technologies continue to improve and expand over time.

One particular area that experiences rapid growth is networking, or more specifically, memory sharing through a network of computer processing units (processors). This not only includes local area and macroscopic networks, but also IC's and portable devices which utilize multiple processors or processors in joint operation. In order to reduce component costs for multiple processors circuits, and to enhance data sharing and local networking functionalities, some device and network configurations utilize shared flash memory architectures. Not only does sharing a single flash memory help reduce component costs, it reduces vital PCB area on circuit boards and allows otherwise consumed PCB area to be devoted for other circuitries. One key advantage of utilizing flash memory is that it is non-volatile, meaning that it does not need power to maintain the information stored in the chip. This is the main reason why many flash memory units are used to store instruction set program codes for processors to execute upon startup. In addition, flash memory offers fast read access times (although not as fast as volatile DRAM memory used for main memory in PCs) and better shock resistance than traditional hard disks. These characteristics help explain the popularity of flash memory for applications such as storage on battery-powered devices.

Figure 1:
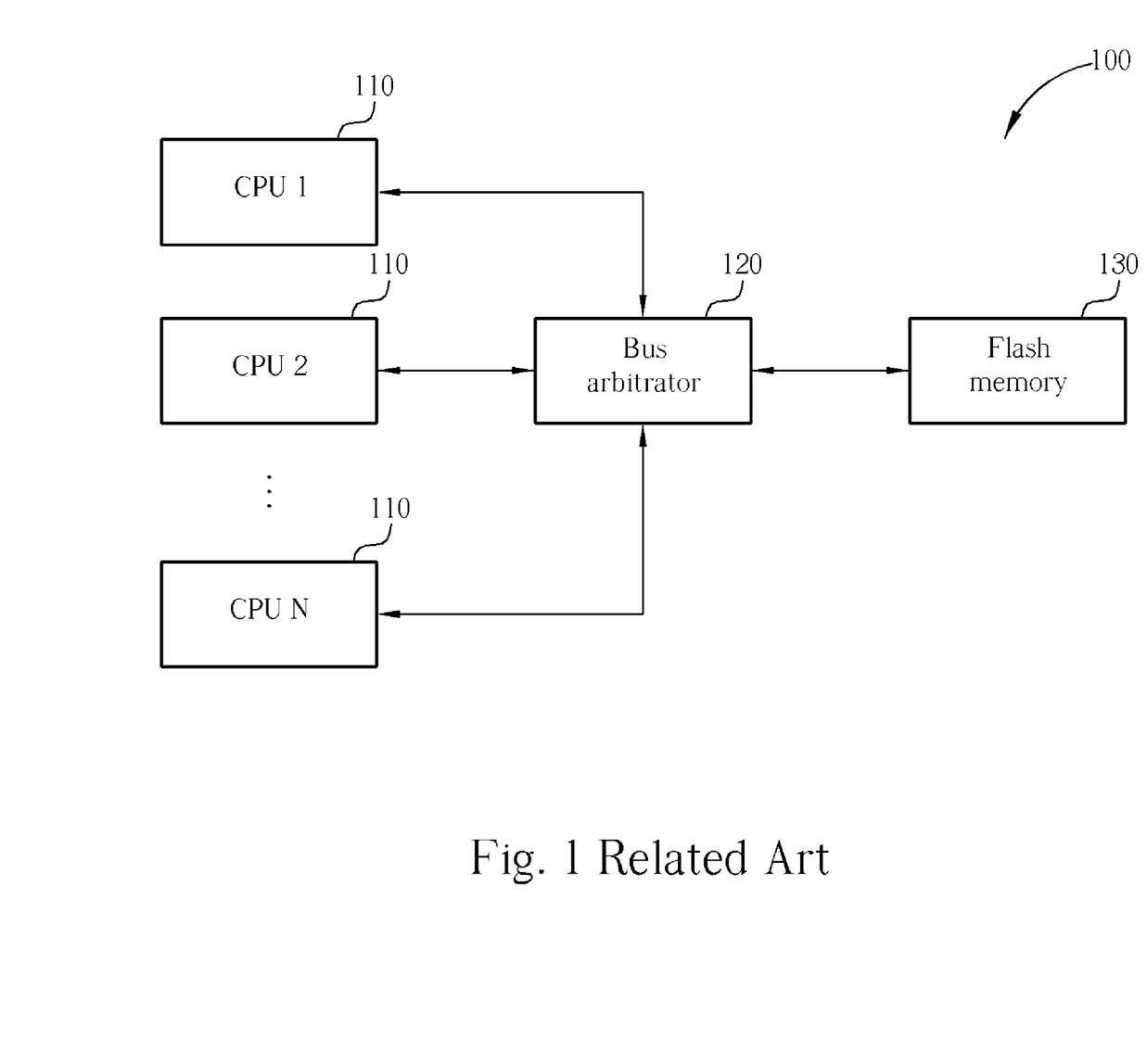
FIG. 1 illustrates a flash memory sharing apparatus according to the related art.

FIG. 1 illustrates a traditional flash memory sharing apparatus 100 between multiple processors according to the related art. The apparatus 100 includes a plurality of processors 110, a bus arbitrator 120 coupled to the plurality of processors 110, and a flash memory unit 130 coupled to the bus arbitrator 120. When one of the processors of the plurality of processors 110 wishes to access data in the flash memory 130, it must provide a read or write request to the bus arbitrator 120. The processor may be trying to access its instruction set stored in the flash memory 130, or it may be simply trying to access general data. The bus arbitrator acts as a router of sorts, and simply separates the time usage of the flash memory 130 between the plurality of processors 110. This provides a direct access connection between the flash memory 130 and the processor initiating the access request. For example, If only one processor of the plurality of processors 110 requests access the flash memory 130, it will temporarily possess sole exclusive access to it. However, if another processor also requests access, the bus arbitrator 120 will then split access between the requesting processors and flash memory 130 by dividing the time allocated to each processor for communicating with the flash memory. Allocation of the access time to the flash memory 130 by the bus arbitrator 120 is therefore a function of the number of processor that request access to the flash memory 130 and their relative priority of access (if applicable).

Although the flash memory sharing apparatus 100 may provide acceptable performance characteristics for networks with limited numbers of processors, some problems may develop when the number of processors 110 in the network increases. When more processors 110 are introduced into the apparatus 100, the bandwidth allocated to each processor 100 becomes reduced, thereby slowing down performance and access time durations to the flash memory 130. This is because the bus arbitrator 120 is now forced to share access to the flash memory 130 with the additional processors 110, further limiting the time alloted to each processor 110 to access to the flash memory 130. For high performance processor 110 applications, such as realtime DSP, this may result in unacceptably slow seek and access times, and possibly even system failure.

Furthermore, this apparatus 100 requires the use of a bus arbitrator 120, which adds to the component and design costs to the apparatus 100, and consumes valuable PCB space if designed onto an circuit board. Also, because the bus arbitrator 120 simply provides direct access (or a direct connection) to the flash memory 130, the requesting processor will have complete access to the flash memory 130 regardless of security permissions or concerns.

SUMMARY OF THE INVENTION

One objective of the present invention is therefore to solve the above-mentioned problems by providing a flash memory sharing apparatus for multiple processors and related method thereof.

According to an exemplary embodiment of the present invention, a non-volatile memory sharing system for sharing a flash memory, EEPROM, or a battery backup memory is disclosed. The system comprises a plurality of processors with at least a first processor and a second processor; a non-volatile memory coupled to the first processor, the non-volatile memory for storing a plurality of program codes or data with at least a first program code or data for the first processor and a second program code or data for the second processor; and a processor bridge coupled between the first processor and the second processor. The second processor is for sending an access request requesting data corresponding to the second program code to the processor bridge. The first processor is for retrieving the access request from the processor bridge, fetching the code or data from the second program specific area in the non-volatile memory according to the access request, and delivering the data to the processor bridge. The second processor is further for fetching the data from the processor bridge.

According to another exemplary embodiment of the present invention, a memory sharing method for a multiple processor system is disclosed. The memory sharing method comprises: providing a plurality of processors including a first processor and a second processor; storing program code including first program code for the first processor and second program code for the second processor in a program code storage module; coupling the first processor to the program code storage module; bridging the first processor to the second processor utilizing a processor bridge; sending an access request from the second processor requesting data corresponding to the second program code to the processor bridge; retrieving the access request from the processor bridge with the first processor; fetching the data corresponding to the second program code from the non-volatile memory according to the access request with the first processor; delivering the data corresponding to the second program code to the processor bridge; and fetching the data from the processor bridge with the second processor.

These and other objectives of the present invention will no doubt become obvious to those of ordinary skill in the art after reading the following detailed description of the preferred embodiment that is illustrated in the various figures and drawings.

DETAILED DESCRIPTION

As described above, current architectures to share flash memory usage between multiple processors require the use of a bus arbitrator, which increases component costs of the relevant circuits as well as critical PCB area. In addition, as the number of processors in the network increases, the bus arbitrator further divides access of the flash memory reducing the allocated bandwidth to each processor. This results in slow access times for each processor requesting access to the flash memory, and possibly even system halts and failures.

Figure 2:
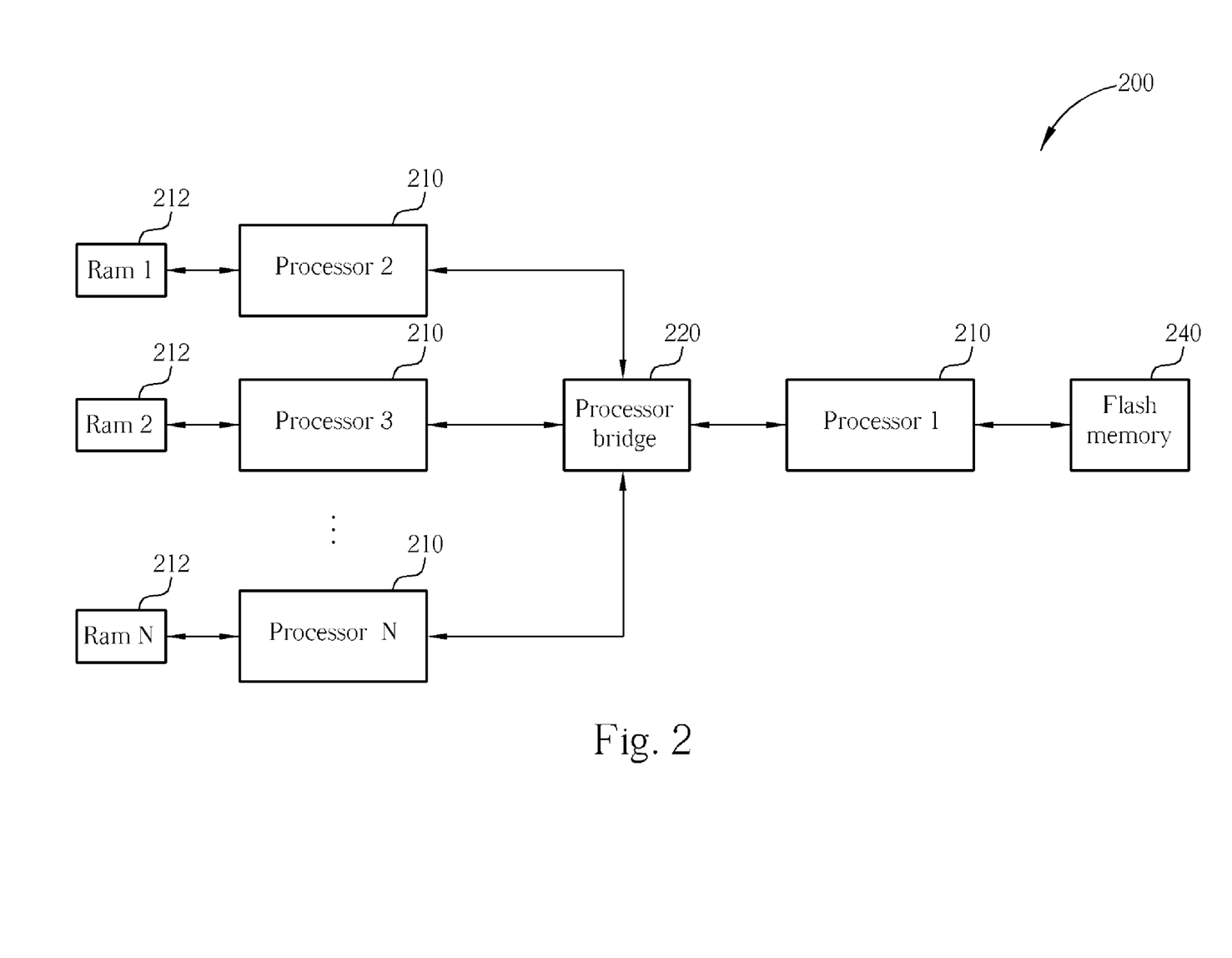
FIG. 2 illustrates an embodiment of a multiple processor system for sharing a non-volatile memory module according to the present invention.

FIG. 2 shows a non-volatile memory sharing system 200 for sharing a non-volatile memory according to a first exemplary embodiment of the present invention. The non-volatile memory sharing system 200 includes a plurality of processors 210, a processor bridge 220, and a non-volatile memory implemented in this embodiment as flash memory module 240. The plurality of processors 210 comprises a first processor (Processor 1, for example, an ARM CPU that is used to calculate navigation data in a GPS receiver) and a second processor (Processor 2, for example, a DSP that is used to measure pseudo range of the satellite signal), as labeled accordingly in FIG. 2. The processor bridge 220, for example, an 12C device or S4W device, or other parallel or serial communication device, is coupled between the first processor and the second processor (and also to any remaining processors 210 in the plurality of processors 210 in other embodiments), while the flash memory module 240 is directly coupled to only the first processor. The total number of processors in the plurality of processors 210 is defined according to system requirements of a designer/user/administrator of the system 200. In other embodiments, a different non-volatile memory device or another type of storage module may be substituted in place of the flash memory module 240.

Using the non-volatile memory sharing system 200 above, a single flash memory module 240 can be effectively utilized and shared between a plurality of processors 210. The memory sharing technique can be utilized for the loading of program/instruction codes for each processor 210 from the flash memory module 240 or storing data according to each CPU application into its specific memory area in the shared memory device. This configuration can also be used for general purpose data sharing between each processor and the flash memory module 240. Both techniques are discussed later on in further detail.

Figure 3:
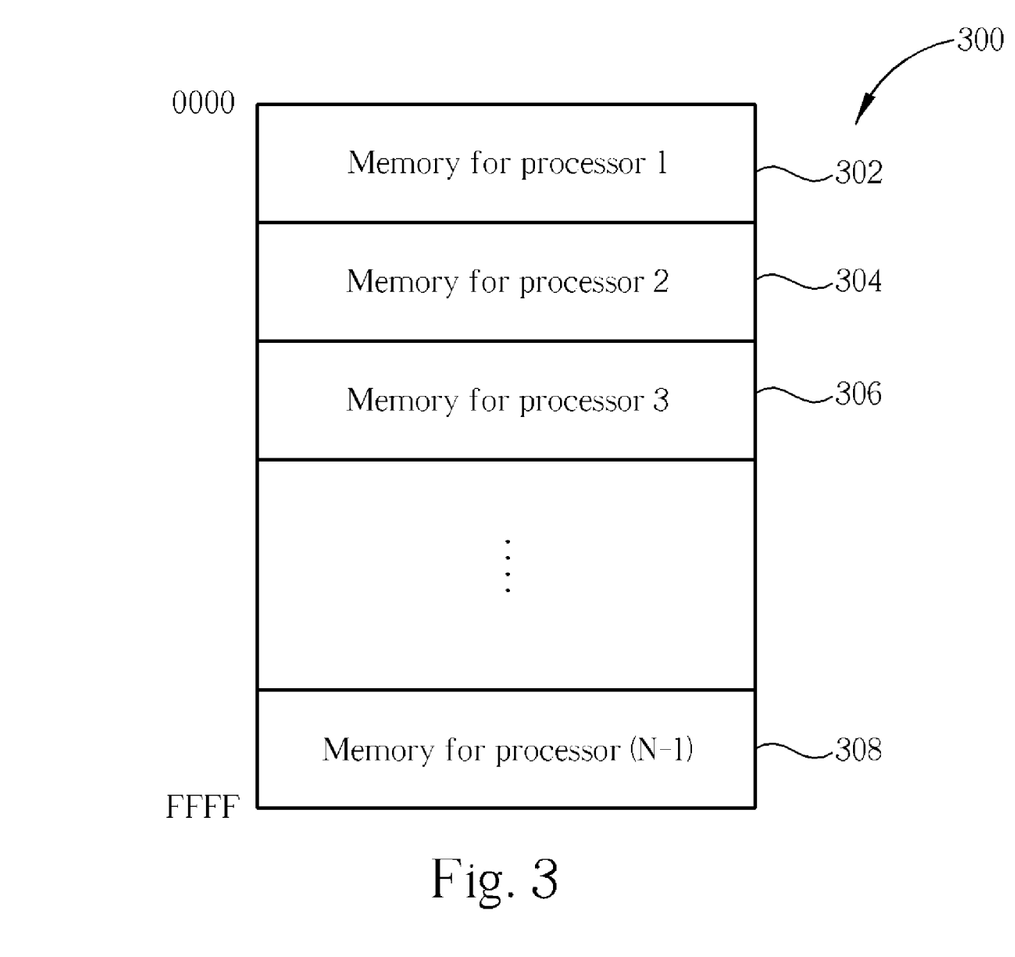
FIG. 3 illustrates an embodiment of a non-volatile memory module having its memory contents divided into sections according to the number of processors in the multiple processor system.

FIG. 3 illustrates a non-volatile memory module 300 having its memory contents divided into sections according to the number of processors 210 in the non-volatile memory sharing system 200. For example, in this embodiment, the memory organization shown in flash memory module 300 of FIG. 3 is utilized for the flash memory 240 of FIG. 2. Each section of the flash memory module 300 represents a specific memory location allocated to each processor 210 in the plurality of processors 210. For example, a first section 302 can be designated for use by Processor 1 (for example, CPU of a PDA or mobile communication device), a second section 304 can be designated for use by Processor 2 (for example, a DSP which is in charge of MP3 function), etc. When the non-volatile memory sharing system 200 is used for the loading of program codes, each specific memory section contains the relevant program code or initialization routine corresponding to the specific processor to which the section is allocated. When the non-volatile memory sharing system 200 is used for general data sharing, each specific memory location contains data relevant to the specific processor for which the section was designated.

The following description explains the use of the non-volatile memory sharing system 200 for the loading of program codes from the flash memory module 240. As described earlier, one of the advantages of flash memory is that it is non-volatile and does not require power to retain its stored data. Therefore, flash memory is commonly used to store program code to be executed by each processor upon startup or initialization. In this embodiment, the flash memory 240 is a program code storage module, which contains a first program code 302 for the first processor (Processor 1), and a second program code 304 for the second processor (Processor 1). In another configuration, the non-volatile memory could further contain a third program code 306 for the third processor (Processor 3), along with additional program codes for specific processors 210 according to the number of total processors 210 in the non-volatile memory sharing system 200.

Being coupled directly to the flash memory 240, upon startup, the first processor (Processor 1) retrieves the first program code 302 directly from the flash memory 240 and executes the program code 302. The first program code 302 is an instruction routine relevant to the first processor (Processor 1) for performing processor operations of the first processor (Processor 1), in addition to an instruction routine allowing the first processor (Processor 1), to pass data between the flash memories 240 to the processor bridge 220.

After the first processor (Processor 1) has executed the first program code 302, the second processor (Processor 2) can perform a program code transfer operation to thereby transfer the second program code 304 from the flash memory 240 for execution by the second processor (Processor 2). This program code transfer operation comprises sending a plurality of access requests to the processor bridge 220 to thereby completely obtain the complete second program code 304 from the flash memory 240. The second processor (Processor 2) sends each access request to the processor bridge 220 to request data corresponding to the second program code 304 in the flash memory 240. The first processor (Processor 1) then retrieves the access request from the processor bridge 220, and proceeds by fetching the data from the second program code 304 from the flash memory 240 according to the access request. The data is then delivered to the processor bridge 220. Upon completion of delivering the data by the first processor (Processor 1) to the processor bridge 220, the second processor (Processor 2) then fetches the data from the processor bridge 220 and can execute the data from the second program code 304 if desired.

In another embodiment, each processor 210 of the plurality of processors 210 can further be coupled to a random access memory (RAM) module from a plurality of RAMs 212 such as a static random access memory (SRAM) or a dynamic random access memory (DRAM). Each specific RAM 212 is therefore directly connected to a corresponding processor 210 to provide storage means for running processes with the corresponding processor 210. For example, as shown in FIG. 2, RAM 1 is directly coupled to Processor 2, and RAM 2 is directly coupled to Processor 3, and so forth. In this embodiment, the second processor (Processor 2) further stores the data fetched from the processor bridge 220 into RAM 1 before executing the data directly from RAM 1.

For high performance processor applications, such as a realtime DSP for example, the program code transfer operation can be performed by the second processor (Processor 2) upon startup to store all the data from the second program code 304 into RAM 1, and the second processor (Processor 2) then executes the second program code 304 directly from the RAM 1 after the second program code 304 has been completely transferred to RAM 1. In this way, the second processor (Processor 2) does not need to request any data from the second program code 304 once it has started executing time critical operations. Therefore, any bandwidth bottlenecks or delays due to the first processor (Processor 1), or other processors 210, accessing data from the flash memory 240 will not affect the time critical operations of the second processor (Processor 2).

In other embodiments the non-volatile memory sharing system 200 may further contain additional processors 210 (ex. Processor 3 to Processor N), also being coupled to the processor bridge 220. As with the second processor (Processor 2), the additional processors 210 perform similar program code transfer operations to retrieve and execute their specific program code (for example, the third processor (Processor 3) requests data from the third program code 306 via access requests to the processor bridge 220, etc). After the first processor (Processor 1) has started executing the first program code 302 directly from the flash memory 240 and has therefore started executing the instruction routine allowing the first processor (Processor 1) to pass data between the flash memory 240 and the processor bridge 220, the additional processors (Processor 2 to Processor N) can each perform program code transfer operations to send a plurality of access requests to the processor bridge 220 to obtain their specific program codes 304-308. The first processor (Processor 1) retrieves each access request from the processor bridge 220, and proceeds by fetching specific data corresponding to the specific program code indicated in the access request from the flash memory 240. The first process (Processor 1) then delivers the requested data the processor bridge 220.

Upon completion of delivery of the data from the specific program code by the first processor (Processor 1) to processor bridge 220, the requesting processor then fetches the data from the processor bridge 220. In the same way as mentioned above, each of the additional processors (Processor 3 to Processor N) can store the data into its RAM module (RAM 2 to RAM (N-1)), and execute the data corresponding to the program code (304 to 308) directly from its RAM (RAM 2 to RAM (N-1)). For example, the third processor (Processor 3) can store data corresponding to the third program code 306 into RAM 2, and then execute the data corresponding to the third program code 306 directly from RAM 2. Again, for high performance processor applications, such as a realtime DSP for example, the program code transfer operation for each of the processors not being coupled directly to the flash memory 240 (Processor 2 to Processor N) can be performed upon startup to store all the data from the respective program codes 304 to 308 into the corresponding RAM 212. In this way, each of the processors not being coupled directly to the flash memory 240 (Processor 2 to Processor N) executes their corresponding program code 304 to 308 directly from their own RAM module. In this way, any bandwidth bottlenecks due to the first processor (Processor 1), or other processors 210, accessing data in the flash memory 240 will not affect the time critical operations.

Figure 4:
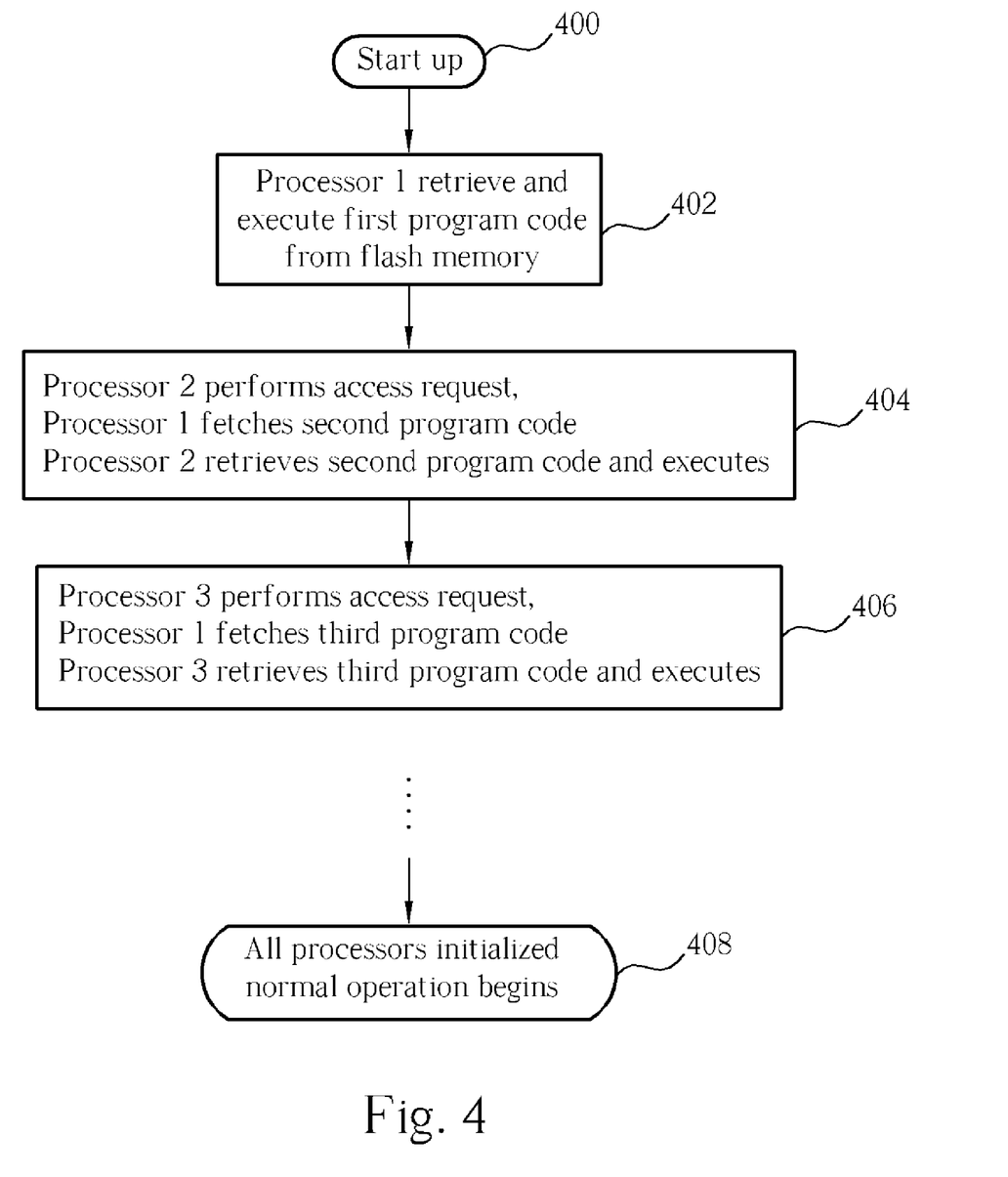
FIG. 4 illustrates a process flow chart for the multiple processor system to retrieve and execute a particular program codes for each processor from the non-volatile memory according to the present invention.

When the system of 200 is used to initialize the plurality of processors 210 with their relevant program codes, this above sequence is repeated until each processor 210 has retrieved and executed its relevant program code for operation. Upon having the first processor (Processor 1) execute the first program code 302 directly from the flash memory 240, the second processor (Processor 2) will perform a program code transfer operation, and execute the second program code 304 after the data corresponding to the second program code 304 is fetched from the processor bridge 220. This is followed by the third processor (Processor 3) performing a second program code transfer operation, and executing the third program code 306 after the second data corresponding to the third program code is fetched from the processor bridge 220. FIG. 4 shows a process flow chart summarizing the above sequence for the non-volatile memory sharing system 200 when used to retrieve and execute program codes 302 to 308 for each processor 210 from the flash memory 240. As shown in FIG. 4, in this embodiment, initializing each of the processor 210 in the non-volatile memory sharing system 200 involves the following steps:

Step 400: The non-volatile memory sharing system 200 enters startup, for example the system 200 may just be turned on or may have just been reset due to a software or hardware reset.

Step 402: Processor 1, being coupled directly to the flash memory, retrieves and executes the first program code 302 from the flash memory 240. Note that the first program code 302 also includes an instruction routine allowing Processor 1 to pass data between the flash memory 240 to the processor bridge 220 according to access requests by the other processors (Processor 2 to Processor N) not being directly coupled to the flash memory 240.

Step 404: Processor 2 performs an access request requesting data corresponding to the second program code 304, Processor 1 fetches the data from second program code 304 in the flash memory 240 and stores it into the processor bridge 220, and Processor 2 retrieves and executes the data corresponding to the second program code 304 from processor bridge 220.

Step 406: Processor 3 performs an access request requesting data corresponding to the third program code 306, Processor 1 fetches the data from third program code 306 in the flash memory 240 and stores it into the processor bridge 220, and Processor 3 retrieves and executes the data corresponding to the third program code 306 from processor bridge 220.

Step 408: All processors (Processor 1 to Processor N) are now initialized and normal operations begins.

Note that between steps 406 and 408 can also be included additional steps for any other processors (i.e., up to Processor N) to perform access requests and retrieve their own respective program code from the flash memory 240 via the processor bridge 220 and Processor 1 similar to the above described steps 404 and 406.

Operation of the non-volatile memory sharing system 200 for general data sharing of flash memory 240 is now described in the following. Suppose Processor 2 requests access to the flash memory 240. It begins by submitting an access request to the first processor (Processor 1) through the processor bridge 220. Processor 1 retrieves this request from the processor bridge 220, and permits the access request if appropriate. For example, if Processor 2 requests to read data at a certain memory address of the flash memory 240, and the access request is granted by Processor 1, then Processor 1 fetches the data from the flash memory 240 to the processor bridge 220. The requesting processor (Processor 2) can then retrieve the requested data from the processor bridge 220.

In other embodiments, additional processors (ex. Processor 3 to processor N) from the plurality of processors 210 can be included and utilized. The additional processors follow the same procedure as outlined above for general data sharing and writing.

In all cases, the processor bridge 220 essentially acts as a mailbox for the exchange of data and access requests. Any processor from the plurality of processors 210 can make an access request to the first processor through the processor bridge 220. The first processor (Processor 1) performs the fetching of data from the flash memory 240 to the processor bridge 220. Thus the processor bridge 220 simply acts to store access requests until they are retrieved by Processor 1, and to store data fetched by Processor 1 from the flash memory 240 for a requesting processor to later retrieve.

When used for general data sharing, access requests also include the appropriate memory address of the flash memory 240 that is be accessed. If a read request from a processor is approved by Processor 1, the appropriate data is then fetched from the flash memory 240 and delivered to the processor bridge 220 for the requesting processor to retrieve.

In addition to access requests, a write request can also be made from a processor 210 to receive data from the flash memory 240. A write request includes the relevant write data to be written, as well as write addresses for the write data to be written at in the flash memory 240. If a write request is approved by the first processor (Processor 1), the write data is retrieved from the processor bridge 220 and stored to the flash memory 240 by the Processor 1 according to the write address specified in the write request.

Approval of access requests and write requests is determined through the first processor (Processor 1), which can either accept or deny access or write requests sent to the processor bridge 220. Thus the first processor can approve certain requests having appropriate authorization, and can reject requests that do not have appropriate authorization. In this way, sensitive information stored on the flash memory 240 is only fetched for a requesting processor if it meets specific security criteria. By preventing any processor from having direct access to the flash memory 240, information is appropriately controlled and shared through the first processor (Processor 1). The criteria for approving an access request can be assigned according to a designer/user/administrator of the non-volatile memory sharing system 200. In one embodiment, the criteria is set such that a requesting processor can only access the memory section in the flash memory 240 designated to the requesting processor. For example, in this embodiment, the first processor (Processor 1) will only approve an access request from the second processor (Processor 2) if it requests data from the second program code 304. Other embodiments may have different criteria for access/read and write request approval, that in no way limit the usage and scope of the present invention. Therefore, other types of approval criteria used while still retaining the same teachings are included in the scope of this invention.

The configuration of the non-volatile memory sharing system 200 therefore does not require a direct connection between requesting processors in the plurality of processors 210 and the flash memory 240. Instead, only the first processor (Processor 1) possesses a direct connection to the flash memory 240. All requests and data exchange take place through the processor bridge 220, which acts as a mailbox for access and write requests to be "picked up" and "dropped off".

Furthermore, the first processor (Processor 1) does not need to be only focused on performing the data fetching of the flash memory 240. Processor 1 is also capable of running concurrent processes (according to the first program code 302) while managing fetching operations from the flash memory 240 for other processors (Processor 2 to Processor N). When an access request is sent to the processor bridge 220, the first processor (Processor 1) can temporarily pause it's current running program or process, handle the access request, and then resume it's running program after completion of the access request. In different embodiments, this could be implemented by an interrupt, a polling operation, or a combination of both.

Figure 5:
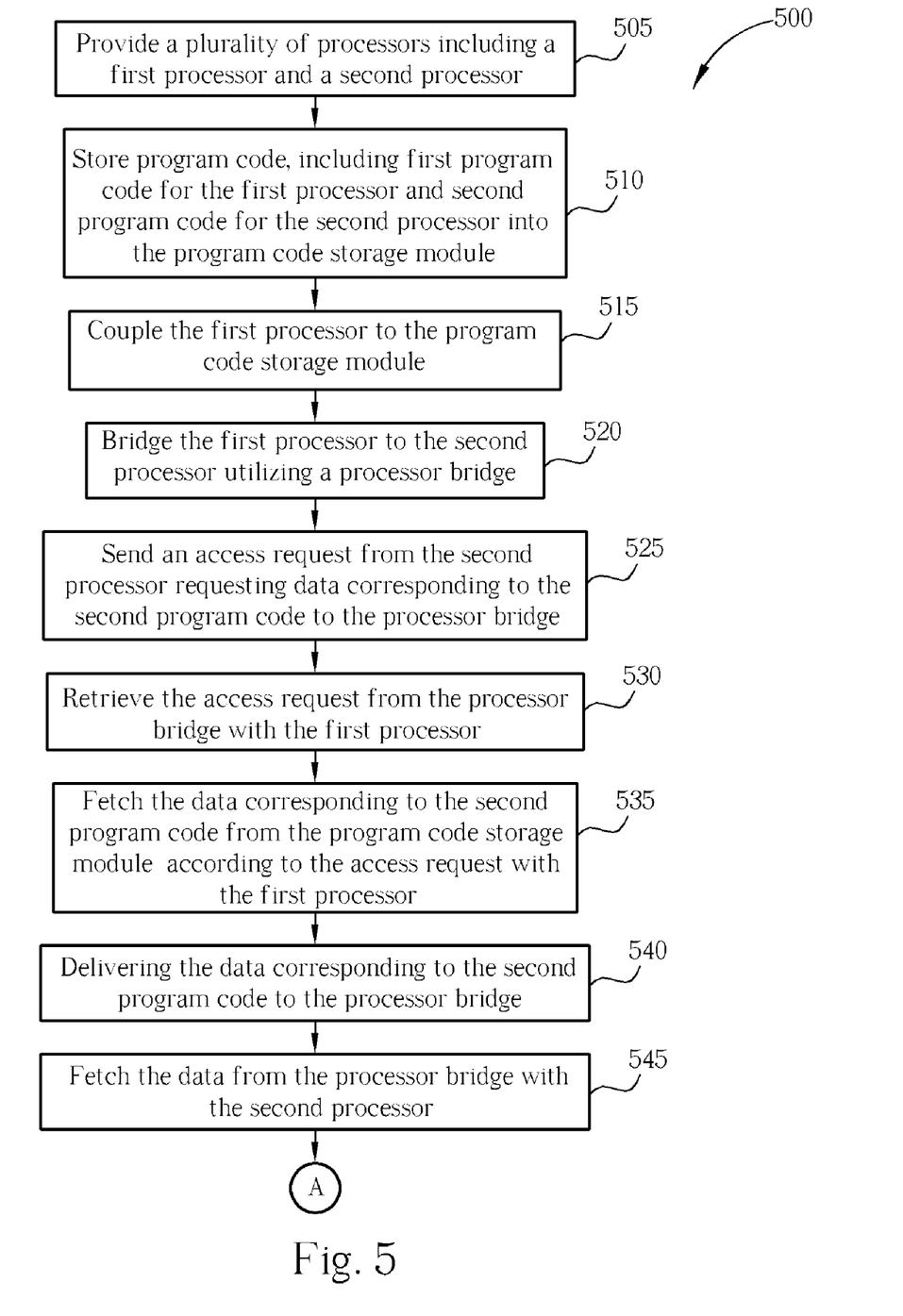
FIG. 5 illustrates the method of multiple processor system for sharing non-volatile memory according to the present invention.
Figure 6:
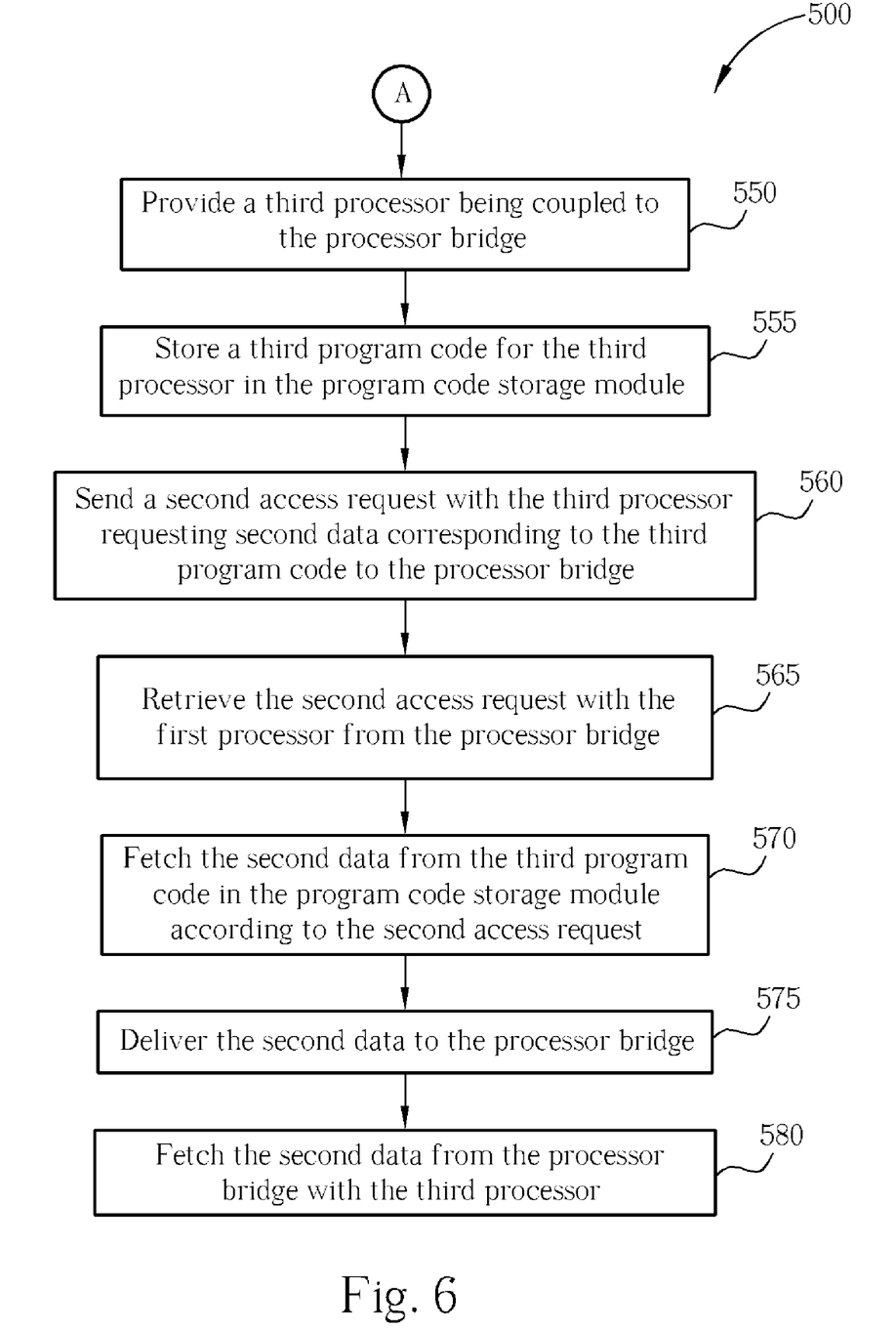
FIG. 6 is a continuation of the method illustrated in FIG. 5

To illustrate a method of sharing flash memory of non-volatile memory sharing system 200, a process flow chart 500 is illustrated in FIGS. 5 and 6 and described in the following. Provided that substantially the same result is achieved, the steps of the process 500 need not be in the exact order shown and need not be contiguous, that is, other steps can be intermediate. According to this embodiment, a method for sharing flash memory 240 between non-volatile memory sharing 210 is as follows:

Step 505: Provide a plurality of processors 210 including a first processor and a second processor.

Step 510: Store program code, including first program code 302 for the first processor (Processor 1) and second program code 304 for the second processor (Processor 2) into the non-volatile memory 240.

Step 515: Couple the first processor (Processor 1) to the non-volatile memory 240.

Step 520: Bridge the first processor (Processor 1) to the second processor (Processor 2) utilizing a processor bridge 220.

Step 525: Send an access request from the second processor (Processor 2) requesting data corresponding to the second program code 304 to the processor bridge.

Step 530: Retrieve the access request from the processor bridge 220 with the first processor (Processor 1).

Step 535: Fetch the data corresponding to the second program code 304 from the non-volatile memory 240 according to the access request with the first processor (Processor 1).

Step 540: Delivering the data corresponding to the second program code 304 to the processor bridge 220.

Step 545: Fetch the data from the processor bridge 220 with the second processor (Processor 2).

Additionally, in other embodiments, further steps can be included for a third processor. These additional steps are illustrated in FIG. 6 and described below for embodiments including a third processor (Processor 3):

Step 550: Provide a third processor (Processor 3) being coupled to the processor bridge 220.

Step 555: Store a third program code 306 for the third processor (Processor 3) in the non-volatile memory 240.

Step 560: Send a second access request with the third processor (Processor 3) requesting second data corresponding to the third program code 306 to the processor bridge 220.

Step 565: Retrieve the second access request with the first processor (Processor 1) from the processor bridge 220.

Step 570: Fetch the second data from the third program code 306 in the non-volatile memory 240 according to the second access request.

Step 575: Deliver the second data to the processor bridge 220.

Step 580: Fetch the second data from the processor bridge 220 with the third processor (Processor 3).

In summary, the present invention provides an apparatus and method to effectively and efficiently share a non-volatile memory 240 between a plurality of processors 210. This allows a single non-volatile memory 240 to be used between several processors 210 in order to reduce production and manufacturing costs of such a related circuit. Networking and memory sharing functions can also be enhanced as a function of this architecture. The apparatus of the present invention does not require a hardware arbitrator device 120 giving each processor 110 access a flash memory 130. Instead, the present invention utilizes a first processor (Processor 1) being directly coupled to the non-volatile memory 240 and a processor bridge 220 to couple the processors 210. Aside from the original task of each processor (say, running RTOS in the first processor and playing MP3 in the second processor), the first processor also acts to "fetch" and "store" access requests to and from the non-volatile memory 240 upon approval of an access request. The processor bridge 220 acts as a mailbox where access requests are sent, and where data to and from the non-volatile memory 240 are temporarily housed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-volatile memory sharing system comprising:
   a plurality of processors comprising at least a first processor and a second processor;
   a non-volatile memory coupled to the first processor, the non-volatile memory for storing a plurality of program codes or data comprising at least a first program code for the first processor and a second program code or data for the second processor; and
   a processor bridge coupled between the first processor and the second processor;
   wherein the first processor is for executing the first program code directly from the non-volatile memory, the second processor is for sending an access request requesting data corresponding to the second program code to the processor bridge; the first processor is for retrieving the access request from the processor bridge, fetching the data from the second program code in the non-volatile memory according to the access request, and delivering the data to the processor bridge; and the second processor is further for fetching the data from the processor bridge.

2. The non-volatile memory sharing system of claim 1, wherein the first processor is further for approving the access request and fetching the data from the second program code in the non-volatile memory according to the access request if the access request is approved; the access request only being approved by the first processor if the access request requests data from the second program code.

3. The non-volatile memory sharing system of claim 1, wherein the plurality of processors further comprise a third processor being coupled to the processor bridge, the third processor for sending a second access request requesting second data corresponding to third program code to the processor bridge; the first processor is for retrieving the second access request from the processor bridge, fetching the second data from the third program code in the non-volatile memory according to the second access request, and delivering the second data to the processor bridge; and the third processor is further for fetching the second data from the processor bridge;
   wherein the non-volatile memory is further for storing the third program code or second data for the third processor.

4. The non-volatile memory sharing system of claim 3, wherein the second processor is for executing the second program code after the data corresponding to the second program code is fetched from the processor bridge, and the third processor is for executing the third program code after the second data corresponding to the third program code is fetched from the processor bridge.

5. The non-volatile memory sharing system of claim 4 further comprising a first random access memory (RAM) module coupled to the second processor and a second RAM module coupled to the third processor; the second processor further for storing the second program code into the first RAM module after the data corresponding to the second program code is fetched from the processor bridge, and for executing the second program code from the first RAM module; the third processor further for storing the third program code into the second RAM module after the second data corresponding to the third program code is fetched from the processor bridge, and for executing the third program code from the second RAM module.

6. The non-volatile memory sharing system of claim 5 wherein the second processor is for performing a first program code transfer operation comprising sending a plurality of access requests to the processor bridge to thereby completely obtain the second program code from the program code storage module, and to completely store the second program code into the first RAM module prior to executing the second program code from the first RAM module; and the third processor is for performing a second program code transfer operation comprising sending a plurality of second access requests to the processor bridge to thereby completely obtain the third program code from the program code storage module, and to completely store the third program code into the second RAM module prior to executing the third program code from the second RAM module.

7. The non-volatile memory sharing system of claim 6 wherein the second processor is for performing the first program code transfer operation immediately upon system startup, and executing the second program code after completion of the first program code transfer operation; the third processor for performing the second program code transfer operation immediately upon system startup, and executing the third program code after completion of the second program code transfer operation.

8. The non-volatile memory sharing system of claim 3 wherein the second processor is further for sending a first write request to the processor bridge, and the third processor is further for sending a second write request to the processor bridge; the first write request comprising first write data and a first write address for the first write data to be stored in the non-volatile memory, and the second write request comprising second write data and a second write address for the second write data to be stored in the non-volatile memory; and the first processor further for retrieving the write request from the processor bridge, storing the first write data in the non-volatile memory at the first write address according to the first write request, retrieving the second write request from the processor bridge, and storing the second write data in the non-volatile memory at the second write address according to the second write request.

9. The non-volatile memory sharing system of claim 3, wherein the first processor is further for approving the access request and fetching the data from the second program code in the non-volatile memory according to the access request if the access request is approved, and the first processor is further for approving the second access request and fetching the second data from the third program code in the non-volatile memory according to the second access request if the second access request is approved; the access request only being approved if the access request requests data from the second program code; and the second access request only being approved if the second access request requests second data from the third program code.

10. The non-volatile memory sharing system of claim 1 wherein the non-volatile memory is divided into sections according to a number of processors in the multiple processor systems, and program code corresponding to a particular processor is stored in a section of the non-volatile memory corresponding to the particular processor.

11. A memory sharing method for a multiple processor system comprising a plurality of processors with at least a first processor and a second processor, a non-volatile memory coupled to the first processor, and a processor bridge coupled between the first processor and the second processor, the non-volatile memory for storing a plurality of program codes comprising at least a first program code for the first processor and a second program code for the second processor, the memory sharing method comprising:
  sending an access request from the second processor requesting data corresponding to the second program code to the processor bridge;
  retrieving the access request from the processor bridge with the first processor;
  fetching the data corresponding to the second program code from the non-volatile memory according to the access request with the first processor;
  delivering the data corresponding to the second program code to the processor bridge; and
  fetching the data from the processor bridge with the second processor.

12. The memory sharing method of claim 11 further comprising executing the first program code directly from the non-volatile memory with the first processor.

13. The memory sharing method of claim 11, wherein the plurality of processors further comprise a third processor being coupled to the processor bridge, the non-volatile memory is further for storing a third program code for the third processor, the method further comprising:
  sending a second access request by the third processor requesting second data corresponding to the third program code to the processor bridge;
  retrieving the second access request with the first processor from the processor bridge;
  fetching the second data from the third program code in the non-volatile memory according to the second access request;
  delivering the second data to the processor bridge; and
  fetching the second data from the processor bridge by the third processor.

14. The memory sharing method of claim 13 further comprising:
  executing the second program code with the second processor after the data corresponding to the second program code is fetched from the processor bridge; and
  executing the third program code with the third processor after the second data corresponding to the third program code is fetched from the processor bridge.

15. The memory sharing method of claim 14, wherein the second processor is coupled to a first random access memory (RAM) module, and the third processor is coupled to a second RAM module, the method further comprising:
  storing the second program code into the first RAM module after the data corresponding to the second program code is fetched from the processor bridge by the second processor;
  executing the second program code from the first RAM module with the second processor;
  storing the third program code into the second RAM module after the second data corresponding to the third program code is fetched from the processor bridge by the third processor; and
  executing the third program code from the second RAM module by the third processor.

16. The memory sharing method of claim 15 further comprising:
  performing a first program code transfer operation with the second processor by sending a plurality of access requests to the processor bridge to thereby completely obtain the second program code from the non-volatile memory;
  completely storing the second program code into the first RAM module prior to executing the second program code from the first RAM module;
  performing a second program code transfer operation with the third processor by sending a plurality of second access requests to the processor bridge to thereby completely obtain the third program code from the non-volatile memory; and
  completely storing the third program code into the second RAM module prior to executing the third program code from the second RAM module.

17. The memory sharing method of claim 16 further comprising:
  performing the first program code transfer operation immediately upon system startup;
  executing the second program code after completion of the first program code transfer operation;
  performing the second program code transfer operation immediately upon system startup; and
  executing the third program code after completion of the second program code transfer operation.

18. The memory sharing method of claim 13 further comprising:
  sending a first write request from the second processor to the processor bridge;
  sending a second write request from the third processor to the processor bridge;
  retrieving the first write request from the processor bridge by the first processor and storing a first write data in the non-volatile memory at a first write address according to the first write request; and
  retrieving the second write request from the processor bridge by the first processor and storing second write data in the non-volatile memory at a second write address according to the second write request;
  wherein the first write request comprises the first write data and the first write address for the first write data to be stored in the non-volatile memory, and the second write request comprises the second write data and the second write address for the second write data to be stored in the non-volatile memory.

19. The memory sharing method of claim 13 further comprising:
- approving the access request only if the access request requests data from the second program code;
- approving the second access request only if the second access request requests second data from the third program code;
- fetching the data from the second program code in the non-volatile memory using the first processor according to the access request if the access request is approved; and
- fetching the second data from the third program code in the non-volatile memory using the first processor according to the second access request if the second access request is approved.

20. The memory sharing method of claim 11 further comprising:
- dividing the non-volatile memory into sections according to a number of processors in the multiple processor system; and
- storing program code or data corresponding to a particular processor into a section of the non-volatile memory corresponding to the particular processor.

* * * * *